United States Patent [19]
Willmann et al.

[11] Patent Number: 5,250,372
[45] Date of Patent: Oct. 5, 1993

[54] SEPARATOR FOR MAT-IMMOBILIZED-ELECTROLYTE BATTERY

[75] Inventors: Norman L. Willmann, Anderson; Neil R. Eisenhut, Pendleton; Jack L. Limbert, Daleville, all of Ind.

[73] Assignee: General Motors Corporation, Detroit, Mich.

[21] Appl. No.: 976,767

[22] Filed: Nov. 16, 1992

Related U.S. Application Data

[60] Division of Ser. No. 933,603, Aug. 21, 1992, which is a continuation-in-part of Ser. No. 748,020, Aug. 21, 1991, abandoned.

[51] Int. Cl.$^5$ .................. H01M 2/16; H01M 2/14
[52] U.S. Cl. .................. 429/146; 429/249; 429/253
[58] Field of Search .............. 29/623.1, 623.5; 429/253, 146, 249

[56] References Cited

U.S. PATENT DOCUMENTS

| | | | |
|---|---|---|---|
| 3,553,020 | 1/1971 | Corbu et al. | 429/88 X |
| 3,862,861 | 1/1975 | McClelland et al. | 429/94 X |
| 4,743,270 | 5/1988 | McCartney, Jr. et al. | 29/623.1 |
| 5,091,275 | 2/1992 | Brecht et al. | 29/623.1 |

FOREIGN PATENT DOCUMENTS

| | | | |
|---|---|---|---|
| 334091 | 9/1989 | European Pat. Off. | |
| 0063779 | 5/1981 | Japan | 29/623.1 |

OTHER PUBLICATIONS

Journal of Power Sources, vol. 23, 1988, Lausanne CH pp. 109-111, J. W. Reitz "Update of Separator Technology for Lead-Acid Batteries".

Primary Examiner—John S. Maples
Attorney, Agent, or Firm—Lawrence B. Plant

[57] ABSTRACT

An electrolyte-immobilizing mat for a mat-immobilized-electrolyte battery comprising a plurality of randomly oriented resilient fibers resistant to and wettable by sulfuric acid electrolyte, wherein the mat is held in a stressed, precompressed state by a resin which is substantially insoluble in sulfuric acid but is sufficiently degradable therein under battery formation conditions to free the mat from its stressed state during formation and allow it to swell within battery cell element. Thermosetting resins and particularly melamine-formaldehyde are preferred. The invention is particularly useful with mats made from glass fibers.

14 Claims, 3 Drawing Sheets

SEPARATOR FOR MAT-IMMOBILIZED-ELECTROLYTE BATTERY

This is a division of application Ser. No. 07/933,603 filed on Aug. 21, 1992, which is a continuation-in-part of Ser. No. 07/748,020 filed on Aug. 21, 1991, now abandoned.

This invention relates to mat-immobilized-electrolyte, Pb-acid electric storage batteries (e.g., gas-recombination batteries) and more particularly to electrolyte-immobilizing mats therefor which facilitate the filling, pickling and forming of such batteries.

BACKGROUND OF THE INVENTION

Mat-immobilized-electrolyte type, Pb-acid electric storage batteries include at least one galvanic cell element comprising opposite polarity electrodes (e.g., a stack of positive and negative plates) separated one from the other by a fibrous, absorbent mat (e.g., polypropylene, Dynel, glass, or felt). The mat in its uncompressed state is thicker than the gap between adjacent opposite polarity electrodes and is compressed between the electrodes where it capillarily immobilizes the battery's electrolyte within the cell element. One such battery is described in U.S. Pat. No. 3,553,020 filed Dec. 20, 1968 in the names of Corbin et al and assigned to the assignee of the present invention.

Mat-immobilized-electrolyte batteries may be either of the "flooded" electrolyte type or "starved" electrolyte type. Flooded-electrolyte-type batteries have the mat and electrodes saturated with electrolyte in that the volume of the electrolyte substantially equals or exceeds the void volume of the pores within the mat and the electrodes. Starved-electrolyte-type batteries, on the other hand, have less electrolyte volume than the void volume of the pores within the mat and the electrodes. So-called gas-recombinant batteries, for example, operate in a starved electrolyte condition wherein electrolyte volume is only about 60% to 90% of the available void volume within the mat and electrodes and thereby provides sufficient void space therein to permit migration of oxygen from the positive electrode directly to the negative electrode for consumption thereat. One such gas-recombinant battery employing a resilient, glass fiber mat is described in McClelland et al 3,862,861.

Assembly and acid-filling of mat-immobilized electrolyte batteries is more difficult than conventional batteries which do not have compressed fibrous mats between the plates. Assembly of mat-immobilized electrolyte batteries, for example, requires the extra step (and associated equipment) of compressing the stack of plates and mats in order to place the stack in the container. Conventional (i.e., mat-free) lead-acid storage batteries are commonly filled with sulfuric acid electrolyte by placing the cell elements in the battery container in the unformed (i.e., uncharged condition) state wherein the positive and negative electrodes both comprise essentially lead oxide. Thereafter, $H_2SO_4$ forming acid is metered into the cell compartment atop the elements until the compartment is filled. The electrodes are subsequently electrolytically formed (i.e., initially charged) by passing a forming current therethrough. In some cases, the residual forming acid is then dumped and fresh acid substituted therefor as the working electrolyte. In other instances, the forming acid has sufficient residual strength to remain in the battery as the working electrolyte. Between the time the forming acid is added and the formation process begins, the sulfuric acid reacts exothermally with the lead oxide in the positive and negative electrodes to form lead sulfate in both the positive and negative electrodes. This sulfation reaction is known in the art as "pickling". The pickling reaction is initially quite vigorous and results in the generation of considerable heat and some gas. This initial pickling reaction subsides considerably after the first several minutes following acid addition as the acid weakens (i.e., becomes more dilute), the electrodes become sulfated and the lead oxide available for reaction decreases.

Electrolytic formation of the battery follows pickling and involves passing forming current through the battery to convert the lead sulfate in the electrodes to lead dioxide in the positive electrodes, lead in the negative electrodes and to reconstitute sulfuric acid in the electrolyte. In addition to any residual pickling heat, the electrolytic formation process adds considerable $I^2R$ heat to the battery thereby causing the temperature of the elements to increase significantly. High element temperatures during formation cause the gassing overvoltage of the electrodes to drop which in turn undesirably causes excessive gassing. Batteries containing glass mats compressed between the electrodes interfere with the circulation of electrolyte between the plates and the escape of heat and gases from the cell element and accordingly retain the pickling heat for significantly longer periods of time than conventional mat-free batteries as well as trap gases within the cell element.

In conventional, mat-free batteries the gassing that occurs during pickling and formation, while undesirable, can nonetheless be tolerated as the gas can readily escape the element from between the plates. For batteries having glass mats compressed between the plates, however, gassing during formation must be kept to a minimum in order to prevent any gas from becoming entrapped within the mat causing so-called "dry spots" therein where little or no acid is present. In this regard, dry spots, whether formed during the pickling or formation reactions, will not only interfere with the formation reaction by causing incomplete formation in some regions of the electrodes and increased current densities in other regions thereof, but ultimately results in undesirable lead treeing (i.e., dendrite growth) between the plates, reduced battery capacity and cold cranking performance, as well as shortened cycle life. Moreover, in conventional, mat-free batteries the electrolyte is more mobile and free to mix and circulate within the cell element due to natural convection so that formation of the plates' active material occurs substantially uniformly throughout the cell element.

Filling mat-immobilized-electrolyte type batteries with electrolyte by dispensing the electrolyte atop the cell element after the cell elements have been placed in their container (i.e., the way conventional batterial are typically filled) can have a detrimental affect on the performance of the battery. In this regard, when so filled, the mats often: make it difficult to obtain uniform distribution of acid throughout the cell element; prevent mixing/circulation of the electrolyte within the cell element during pickling and formation; can result in vaporization of the electrolyte within the cell element during pickling; and/or result in mats containing pockets of trapped gases (i.e., dry spots). More specifically, electrolyte introduced into the container atop the cell element percolates down through the cell element from the top thereof at a rate limited by the wicking rate of the glass mat. The presence of the mat can cause trapping of air within the element, can prevent the ready escape of the gases and heat generated therein during the pickling reaction and can prevent acid from circulating between the electrodes. Some of the filling acid may run down the sides of the element and make inroads into the elements from the sides, but this too is slow and still traps gases and heat. As a result, not only are dry spots prevalent, but the temperature of the element is not uniform and may be elevated to an undesirably high level and maintained thereat for a prolonged period of time. Moreover, the concentration of the electrolyte within the cell element tends to vary from one location to the next. One reason for this is the stratification that occurs by virtue of the electrolyte front's descending down or otherwise into the cell element. As the electrolyte front (i.e., the initial few centimeters of the electrolyte wave moving into the element) advances into the element, it is more rapidly depleted of its $H_2SO_4$ content then is the electrolyte tracking behind the front. As a result, by the time the liquid front moves into the center of the element, it has much lower sulfuric acid concentration than the acid tracking behind it (e.g., near top of the element). If the wicking rate and starting acid temperature are slow and high (e.g., ambient temperature) respectively, it is possible to end up with a slightly alkaline aqueous solution in the middle of the element. This results in high $Pb^{++}$ solubility due to the high pH and high temperatures. If this solubility is high and remains high even for only several minutes, the soluble lead migrates into the separators where it is converted to lead which electrically bridges (i.e., shorts) adjacent electrodes during formation and/or subsequent charging. Moreover, this acid concentration imbalance affects the conductivity of the electrolyte at different locations in the element which, in turn, affects current density distribution during formation. Another reason for electrolyte concentration variations is the formation of dry spots resulting from trapped gases discussed above. Eventually, acid will infiltrate even into the dry spots, at least to some extent, but is quickly consumed by the unformed PbO in the regions of the electrodes adjacent the dry spots resulting in pockets of low concentration acid within the element. Finally, because mat-immobilized electrolyte elements do not take up electrolyte as quickly as mat-free elements, care must be taken to meter the electrolyte into the container atop the element at a sufficiently slow rate as to preclude overflow thereof from the top of the container above the cell element.

McCartney, Jr. et al 4,743,270 proposes to minimize some of the aforesaid problems by putting the electrolyte into the container first, and then immersing the cell element slowly into the electrolyte. Another manufacturer reduces the need to compress the stack during assembly into its container and purportedly reduces the acid-fill time by impregnating the resilient fibrous glass mat with a water/acid soluble glue/binder and precompressing the mat by as much as 50 percent. The binder holds the separator in its precompressed state until it is wetted by electrolyte during filling. The glue dissolves as soon as it is wetted by electrolyte and allows the resilient glass mat to immediately spring back, swell within the cell and press tightly against the plates it is sandwiched between. Suggested water soluble binders include methyl cellulose (preferred), carboxymethy cellulose, ethylhydroxyethyl cellulose, hydroxyethyl cellulose, fish glue, soybean glue, guar flour (from the fruit of the carob tree) as well as starch and dextrin based glues.

While the use of precompressed mats bound with water/acid-soluble binders facilitates assembly and perhaps accelerates acid filling to some extent, they do not completely solve the acid filling problem much less the heat and gas trapping or electrolyte circulation problems discussed above in connection with pickling and formation. In this regard, the mats bound only by water-/acid soluble binders begin to swell as soon as they are wetted with electrolyte so that the first wetted portions of the mat (i.e., adjacent the electrolyte fill opening in the container) swell, partially close off the acid entry zone and retard rapid flow and even distribution of the electrolyte throughout the cell element. This is true even though a substantial portion of the separator which is remote from the fill opening might still be compressed.

A better solution to the aforesaid filling, pickling and formation problems would be (1) to get the electrolyte distributed evenly throughout a mat-immobilized electrolyte-type cell element as quickly as possible, (2) to insure that the gases and heat generated during pickling and formation can readily escape the cell element, and (3) to maintain good mixing/circulation of the electrolyte in the element at least into the early stages of the formation cycle.

OBJECT OF THE INVENTION

Accordingly, it is the principle object of the present invention to provide a unique, resilient fibrous mat for mat-immobilized-electrolyte, lead-acid storage batteries which permits rapid, substantially uniform, filling of the batteries with electrolyte as well as ready degassing, cooling and circulation of the electrolyte during pickling and formation of the battery. It is a further object of the present invention to provide a unique, readily acid-fillable, mat-immobilized-type, Pb-acid storage battery including the aforesaid separators and a method of assembling and preparing same for service. These and other objects and advantages of the present invention will become more readily apparent from the detailed description thereof which is given hereafter in conjunction with the several drawings wherein:

SUMMARY OF THE INVENTION

Figure 1:
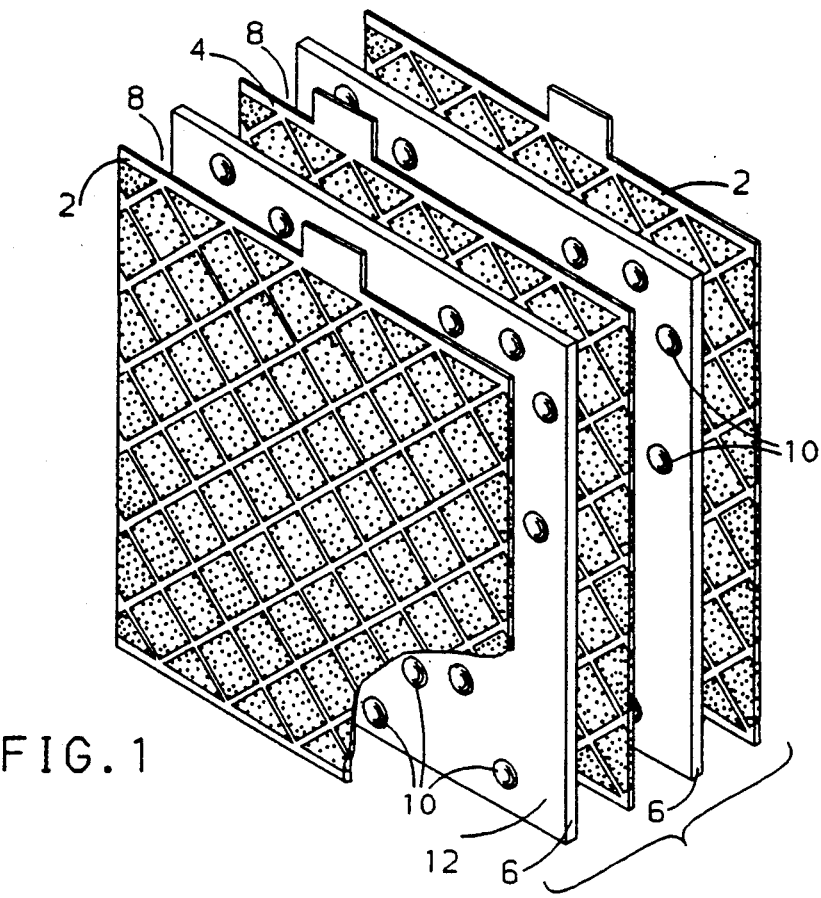
FIG. 1 is a partially broken away, exploded, isometric view of a battery cell element including an electrolyte-immobilizing separator in accordance with the present invention.

The present invention comprehends an improved separator for a mat-immobilized-electrolyte, lead-acid, storage battery (e.g., gas-recombinant battery). The separator comprises a mat of randomly oriented resilient fibers resistant to and wettable by sulfuric acid electrolyte and a binder for holding the mat in a stressed state at a predetermined precompressed thickness at least into the beginning of the formation process. The invention is particularly applicable to fibrous glass mats commonly used in gas-recombinant batteries and described in McClelland et al (supra). The binder comprises a thermosetting resin which is insoluble in sulfuric acid under normal conditions (i.e., ambient temperature) but is sufficiently degradable therein under battery formation conditions (i.e., high temperature and oxidative) as to free the stressed resilient fibers therefrom and allow the separator to expand while the battery is being formed. Such an acid-resistant binder insures retention of the precompressed state throughout filling, pickling and at least the initial part of the formation process and delays expansion of the separator until after these essential processes have been completed or are well under way. Binders seen to be effective for retaining the mat in such a prolonged compressed state are the insoluble thermosetting resins commonly used in the paper-making industry to provide wet strength to paper. Hence, polyacrylics such as Parez 631 NC available from the American Cyanamid Company or melamine formaldehyde such as Paramel HE also available from the American Cyanamid Company are candidate binders for this application, with melamine-formaldehyde being less likely to degrade in $H_{24}$ alone than the polyacrylics. Other possible candidates include self-linking acrylic emulsions commonly used as fabric stiffeners (e.g., Rhoplex 618, sold by the Rohm and Haas Co.) and the "warm box" and "hot box" resins which are commonly used in the foundry industry for bonding cores or mold sands together and which are based on urea formaldehyde, phenol formaldehyde, furfuryl alcohol and/or furon, as is well known in the foundry industry. In the case of melamine formaldehyde the resin prepolymers may be added to the glass mat after it has already been formed by the manufacturer (e.g., by saturating or spraying the mat with a solution/suspension of the prepolymers). Preferably, however, the resin prepoloymers will be added to the fibers at the time the mat itself is being formed by its manufacturer by including the prepolymer resin in the slurry used to manufacture the glass mat in the first instance. The mat is then dried, compressed and heated to cure the resin to form the binder of the present invention.

The separator in its uncompressed state will be thicker than the gap between the positive and negative electrodes on either side of the separator and will preferably be compressed to a thickness which is at least about 10 percent preferably about 20 percent less than that gap.

In a preferred embodiment, the mat will include a plurality of protuberances projecting from at least one face of the separator to space the separator from the adjacent electrode. Most preferably, the protuberances will be on both faces of the separator to center the separator between the electrodes. The thickness of the separator between the outboard extremities of the protuberances will be equal to or slightly more than the desired interelectrode gap (i.e., gap between the positive and negative plate). The majority of the separator, area-wise, is a web portion which lies between the protuberances and which is compressed more than the protuberances and preferably to about 20 percent less than the interelectrode gap that the separator is to fill. The protuberances space the web portion from the electrodes on either side thereof and provide flow channels between the web and the adjacent electrode(s) for facilitating the rapid flow of electrolyte into the electrode/separator stack (i.e., cell element) which flow would otherwise be inhibited by glass mat.

The invention further comprehends a method of assembling and preparing a mat-immobilized-electrolyte, lead-acid, storage battery for service including the steps of alternately stacking a plurality of positive and negative polarity electrodes together so as to have a predetermined interelectrode gap between adjacent electrodes; positioning a separator in each of the gaps between the electrodes wherein the separator comprises a mat of randomly oriented resilient fibers and an acid-resistant binder of the type described above holding the mat in a stressed state at a compressed thickness which is at least about 10 percent less than the gap; positioning the electrode-separator stack in a battery container; introducing sulfuric acid electrolyte quickly into the container and throughout the stack substantially unencumbered by the compressed mat; allowing the thusly filled battery to stand for a sufficient period of time (i.e., about 30 minutes or more) until the pickling reaction is well under way; and, thereafter, electrolytically forming the battery so as to convert the electrodes to Pb and $PbO_2$ and concurrently degrade the binder sufficiently to release the resilient fibers from their confinement by the binder so that they can rebound their unstressed state and cause the separator to tightly engage the electrodes on either side thereof. Preferably the sulfuric acid will be added to the container at a sub-ambient temperature (e.g., about 0° F.) to keep the temperature of the battery below of about 130° F. during is pickling. After the pickling reaction is substantially complete, the battery is subjected to formation which elevates the temperature of the battery above 160° F. and preferably above 170° F. as a result of some continuation of the pickling plus the $I^2R$ heating that occurs within the battery during formation. Formation continues for a time sufficient (e.g., 20 hours or more) to completely convert the positive and negative active materials to lead dioxide and lead as appropriate. This prolonged high temperature and oxidative environment also serves to degrade the otherwise acid stable binder to the point where the fibers entrapped thereby are released and spring back to fill the interelectrode gap.

In accordance with the invention, it is desirable to keep the separator in the precompressed state and not permit it to expand during the filling, pickling and initial formation procedures. It is desirable to get the acid into the plates as quickly and as uniformly as possible to insure uniform pickling of the electrodes. It is likewise important to keep the interelectrode gap as free as possible during pickling. In this regard, keeping the mat under compression (i.e., by not breaking down its binder) permits the gases generated during pickling to readily rise within the cell element which not only promotes mixing of the acid therein but ready escape of the hot gases from the cell element rather than trapping therein and formation of gas voids and dry spots within the element. Moreover, unencumbered flow of the electrolyte in the interelectrode gap lets natural convection occur whereby hotter acid can readily rise between the plates which further promotes mixing of the electrolyte therein and more uniform temperature distribution and pickling (i.e., sulfation) of the plates. Temperaturewise, it is desirable to maintain a substantially uniform temperature throughout the element plates and to preferably keep that temperature below about 130° F.

It is likewise desirable to keep the separator in a precompressed state as long as possible during the formation step to promote acid circulation within the cell stack as well as escape of hot gases therefrom. In this latter regard, not only are the gases more easily permitted to escape from the cell stack, but in the course thereof, the movement of the gases through the cell stack helps promote the movement of the electrolyte into the mat for a more complete wetting thereof by the electrolyte.

One binder in accordance with the present invention comprises melamine formaldehyde resin of the type typically used in the paper industry for increasing the wet strength of paper. The resin is added to the fiber as a prepolymer thereof and, in the subsequent processing, is heated to cause cross-linking thereof and formation of durable, acid-resistant bonds which hold the fibers together. The concentration of the binder in the separator will be up to about 5 percent by weight. It is desirable, however, that the least amount of binder be used as is possible consistent with the need to form a bond between the resilient fibers which will resist the capillary forces that occur upon wetting of the mat and which tend to physically break the bonds without actually chemically grading the binder itself. In the case of glass fibers, it is anticipated that at least about 2 percent by weight of the glass is necessary for this purpose. A lesser amount of binder may be possible by enhancing the bond between the polymer and the glass fiber. In this regard, the bond between the glass and the binder can likely be enhanced by first applying a coupling agent to the surface of the glass. A number of commercially available silane coupling agents such as gamma-chloropropyltrimethoxysilane, vinyltrichlorosilane, vinyltriethoxysilane vinyltrimethoxysilane, vinyltris(-Beta-methoxyethoxy)silane, gamma-methacryloxypropyltrimethoxysilane, Beta-(3,4-epoxycyclohexyl)ethyltrimethoxysilane, gamma-glycidoxypropyltrimethoxysilane, gamma-mercaptopropyltrimethoxysilane, gamma-aminopropyltriethoxysilane, N-Beta-(aminoethyl)-gamma-aminopropyltrimethoxysilane, and gamma-ureidopropyltriethoxysilane are believed useful for this purpose. In the surface treatment process, the silane coupling agent is added to a mixture of water and alcohol or to other appropriate organic solvents in an amount of 0.1 wt. % to 5 wt. %, with respect to the amount of the glass fibers to be treated. The pH of the solution of the silane coupling agent and the solvent is adjusted to be at such a pH at which the silane coupling agent is hydrolyzed. The fibers are then contacted with the solution and the excess solution removed followed by drying the fibers. Thereafter the fibers are subjected to heat treatment at 100° C. to 120° C. to promote bonding of the silane to the glass. Alternately, the silane may be mixed directly with the binder suspension used to impregnate the mat. The glass fibers (i.e., with or without the silane pretreatment) are finally coated with a solution/suspension of a prepolymer of the binder in a pH-controlled medium. An appropriate catalyst may be included in the suspension/solution as may be required to initiate further curing (e.g., cross-linking). Excess liquid is removed and the coated fibers dried. In this condition, the resin remains essentially inactive at ambient temperature but will, upon application of heat, cure or cross link to form the acid-resistant binder of the present invention.

Preferably, the resin is added to the glass fiber at the time the mat is first made and in essentially the same way that it is added to a cellulose pulp in the well known paper-making process. Thereafter excess liquid is removed from the mat-making slurry through a series of steps including the application of vacuum and finally heating to dryness. Alternatively a premade mat may be saturated with the prepolymer solution and dried. Thereafter to precompress the separator, the mat is pressed at about 200° F. between perforated heated plates while drawing a vacuum through the perforated plates. A stop, of the appropriate thickness, is provided to control the final spacing of the plates during the pressing operation and hence the thickness of the finished separator. The heated plates causes the resin to cure and bond the fibers together in the compressed state. For those embodiments having protuberances for spacing the separator from the adjacent electrodes, the perforated, heated plates will have appropriately formed dimples or grooves formed therein for molding or otherwise shaping the face(s) of the separator during the compression operation. When such protuberances are used the perforations in the heated plates will preferably be located in the dimples or grooves used to form the protuberances.

Examples and Detailed Description of Specific Embodiments of the Invention

EXAMPLE A. A mat supplied by the Hollingsworth & Voss Company and identified as HV260, which is a glass mat weighing 260 grams per square meter and having an average thickness of about 0.0675 inches is impregnated with a melamine formaldehyde prepolymer sold by the American Cyanamid Corporation, under the trade name Paramel HE. As purchased, Paramel HE is a 6 percent by weight suspension of the prepolymer in a pH-controlled aqueous solution. A sufficient amount of the Paramel solution is added to water to provide 120 grams of resin per liter of solution and this solution is used to impregnate/saturate a preformed mat. This solution must be acidic to effect curing of the resin. Excess liquid is drawn off from the saturated mat by vacuum. The mat is then dried and finally heated between two hot plates (i.e., 200° F.) for two minutes. The plates are spaced apart by a distance of 0.035 inches and form a compressed mat having a binder content of about 4 percent by weight of the glass. Immersion of the compressed mat in room temperature 1.260 specific gravity sulfuric acid will not cause the mat to spring back to its original uncompressed state, whereas exposing the mat to a battery formation environment will cause it to spring back.

EXAMPLE B. Two groups of mats, similar to those described in EXAMPLE A were separately impregnated with (1) a solution comprising 180 mls/liter of water of Parez 631 NC polyacrylic binder, and (2) a solution comprising 60 mls/liter of water of the same Parez material. The mats were dried, compressed and the resin cured in the same manner as described in EXAMPLE A but at a temperature appropriate for the polyacrylic binder. Test cells built up from these separators were formed and cold rate tested (i.e., at 0° F. and 400 amps discharge rate) with the following results. The cells made from mats having the higher resin loading displayed a 10 sec. voltage of 1.22 V, a 30 sec. voltage of 1.07 V and a discharge time of 57.4 secs. to 0.83 V/cell. The cells made from the batch of mats having the lower resin loading displayed a 10 sec. voltage of 1.44 V, a 30 sec. voltage of 1.41 V/cell and a discharge time of 105.4 secs. to 0.83 V/cell. Lower resin concentrations are expected to produce even better results. Based on these tests it was concluded that the mats having the higher resin concentration do not spring back as much as the lower concentration samples and likely leave some residual resin which affects the electrical resistance of the battery. While the reduced spring-back and residual resin seemingly had no effect on the battery's reserve capacity, it did have an effect on the batteries "cold-cranking" performance. Hence, the higher resin concentration separator batteries are seen to be acceptable for such application as electric vehicles and uninterample power supply (UPS) activity, while the lower resin concentration cells are preferred for SLI applications (i.e., automobile cranking).

Figure 2:
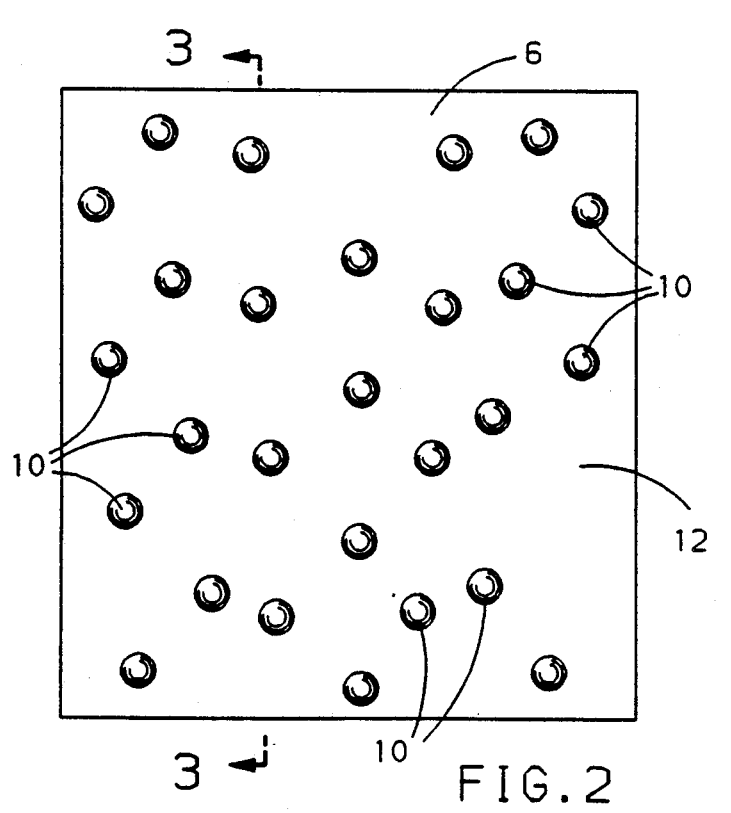
FIG. 2 is a plan view of a precompressed separator in accordance with the present invention.
Figure 3:
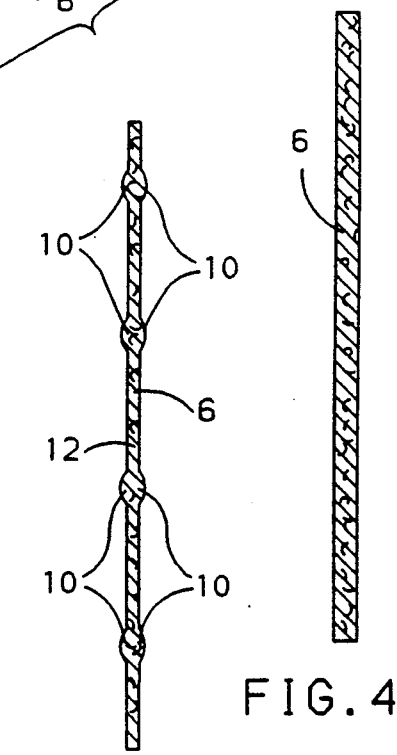
FIG. 3 is a view in the direction 3—3 of FIG. 2.
Figure 4:
FIG. 4 is a similar view to that of FIG. 3, after the binder has been destroyed during formation and the precompression has been relieved.

FIG. 1 is an exploded, partially broken away view a battery cell element in accordance with the present invention including positive polarity plates 2, a negative polarity plate 4, an interplate glass mat separator 6 positioned in the gap 8 between the positive and negative polarity electrodes. The glass mat 6 includes hemispherical protuberances 10 for spacing the separator 6 from the adjacent electrodes 2 and 4 as appropriate. As best shown in FIGS. 2 and 3, the hemispherical protuberances 10 project from a thinner web portion 12 of the separator 6 and are preferably on both sides of the web 12. Alternatively, the protuberances may project from only one side to space the separator from only one electrode and, in such an embodiment, it is preferred that the protuberances be on the face of the separator which is destined to abut the positive electrode, which is the thicker of the two electrodes, and requires more acid. Similarly, glass mats typically have one smooth face and one rougher face as a natural result of the process whereby they are made. It is preferred that the smooth face of the separator abut the positive electrode, as the smooth surface tends to wick acid more readily than the rougher surface. FIG. 3 shows the stressed, precompressed separator of the present invention before formation. FIG. 4 illustrates the separator 6 of FIG. 3 after formation is complete and the web portion 12 has expanded to the thickness of the protuberances 10 which are no longer seen in the expanded mat.

Figure 5:
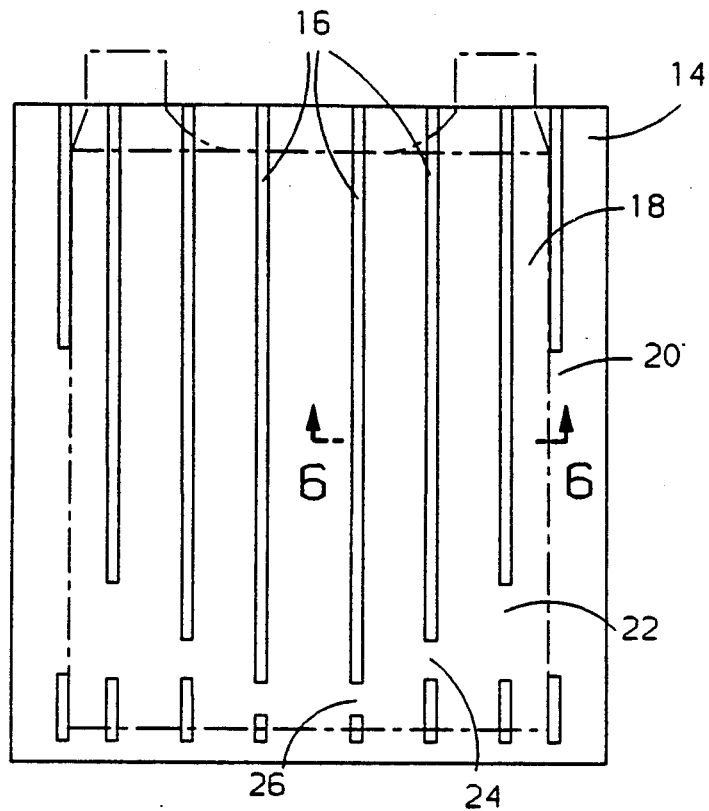
FIG. 5 is a plan view of another embodiment of a separator in accordance with the present invention.
Figure 6:
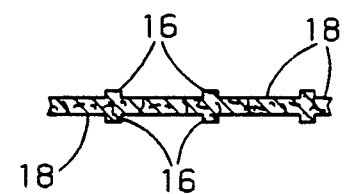
FIG. 6 is a view in the direction 6—6 of FIG. 5.
Figure 7:
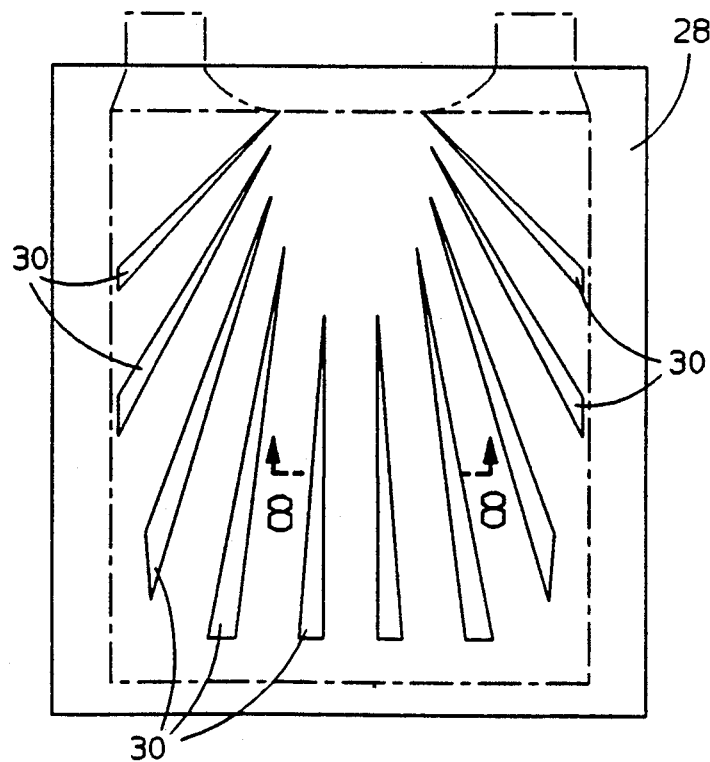
FIG. 7 is a plan view of still another embodiment of a separator in accordance with the present invention.
Figure 8:
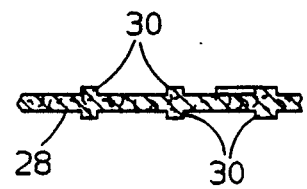
FIG. 8 is a view in the direction 8—8 of FIG. 7.

FIGS. 5 and 6 illustrate another embodiment of the invention wherein the separator 14 includes a plurality of rib-like protuberances 16 between the compressed web portion 18. The ribs 16 are preferably discontinuous from top to bottom as shown by the discontinuities 20, 22, 24 and 26, which permit acid flowing down along the sides of the cell element to readily move laterally into the cell element at the bottom corners of the element and then upwardly from the bottom of the cell element to facilitate more rapid filling of the cell element with acid. FIGS. 7 and 8 show still another embodiment of the present invention which includes a separator 28 and a plurality of rib-like protuberances 30 in a fan-like array as illustrated.

Figure 9:
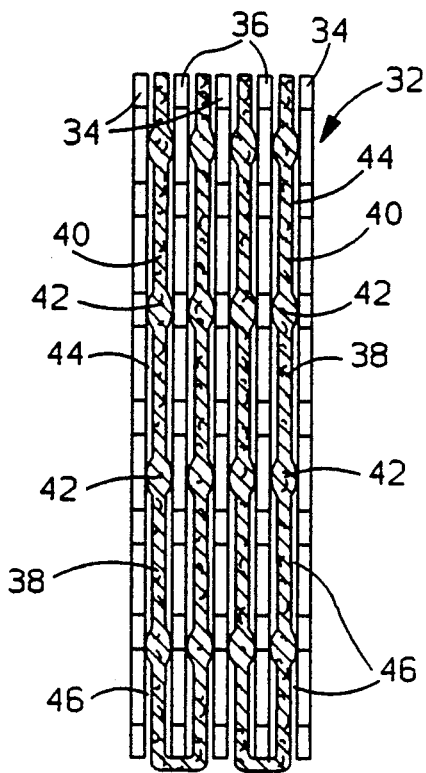
FIG. 9 is a side elevational view of a cell element in accordance with the present invention before the separator's binder has been destroyed.
Figure 10:
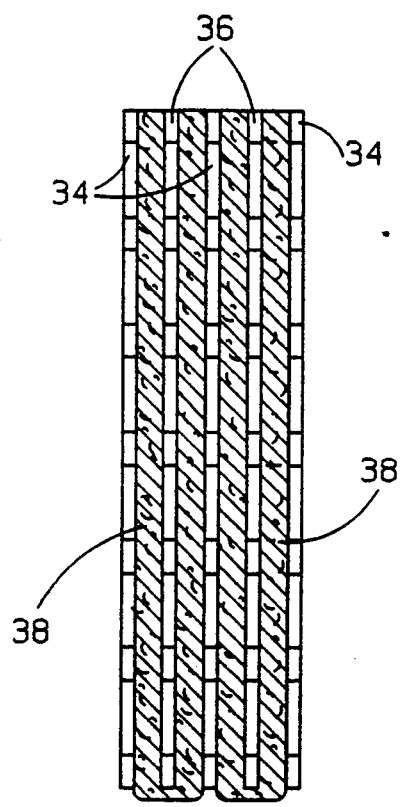
FIG. 10 is a side elevational view of the cell element of FIG. 9 after the separator's binder has been destroyed.

FIGS. 9 and 10 show a battery cell element 32 in accordance with the present invention before and after formation of the cell element respectively. More specifically, FIG. 9 shows a cell element 32 comprising a plurality of positive electrodes 34 interspersed between negative polarity electrodes 36 each separated, one from the other, by precompressed separator 38 having web portions 40 and protuberances 42 in accordance with the present invention. As illustrated in FIG. 9, the separators 38 will be wrapped around, or enveloped about, the bottom edge of the negative electrodes 36. Moreover and as best shown in FIG. 9, the thickness of the precompressed separator at the web 40 will be less than the interelectrode gap 44 between the positive and negative electrodes. The thickness of the separator 38 at the protuberances 42, however, will be approximately equal to that of the intended interelectrode gap 44 such that little or no compression of the cell element is required during the final assembly operations of the battery. During filling, the gap 46 between the webs 40 of the separator and the adjacent electrodes 34, 36 serve as flow channels for facilitating the rapid flow of electrolyte into the cell element 32. FIG. 10 illustrates the cell element of FIG. 9 after formation has taken place and the separator 38 has swollen due to the degradation of the binder and release of the resilient glass fibers therefrom.

While the invention has been disclosed primarily in terms of specific embodiments thereof it is not intended to be limited thereto but rather only to the extent set forth hereafter in the claims which follow.

We claim:

1. In a mat-immobilized-electrolyte, Pb-acid storage battery separator comprising a mat of randomly oriented, resilient fibers resistant to and wettable by sulfuric acid electrolyte, and a binder holding said mat in a stressed state at a compressed thickness which is less than the unstressed and uncompressed thickness of the mat, the improvement wherein: said binder comprises a resin which is substantially insoluble in sulfuric acid but is sufficiently degradable therein under battery formation conditions as to free said mat from said stressed state during formation whereby a separator is provided the expansion of which is delayed until after electrochemical formation of the battery has commenced.

2. A separator according to claim 1 wherein said fibers comprise glass and said compressed thickness is at least about 10 percent less than the operational thickness of the separator in the battery after formation.

3. A separator according to claim 1 wherein said binder comprises a thermosetting resin.

4. A separator according to claim 3 wherein said resin is melamine-formaldehyde.

5. A separator according to claim 2 wherein said binder comprises melamine-formaldehyde.

6. A separator according to claim 1 wherein said mat includes a web portion intermediate a plurality of protuberances projecting from at least one face of the mat to space the web portion from an adjacent electrode during filling of the battery with electrolyte, said web portion being at said compressed thickness.

7. A separator according to claim 6 wherein said protuberances project from opposite faces of the separator to substantially center the web portion between adjacent electrodes.

8. A separator according to claim 2 wherein said mat includes a web portion intermediate a plurality of protuberances projecting from at least one face of the mat to space the web portion from an adjacent electrode during filling of the battery with electrolyte and the thickness of said web portion is said compressed thickness.

9. A separator according to claim 8 wherein said protuberances project from opposite faces of the separators to substantially center the web portion between adjacent electrodes.

10. A separator according to claim 8 wherein said protuberances comprise elongated ribs.

11. A separator according to claim 10 wherein said ribs are substantially parallel to each other.

12. A separator according to claim 10 wherein said ribs are arranged in a substantially fan-like array.

13. A separator according to claim 11 wherein said parallel ribs are discontinuous to permit ready lateral flow of electrolyte between the electrodes of the battery during filling.

14. A separator according to claim 1 wherein said binder comprises an acrylic resin.

* * * * *